(12) United States Patent
Krauss et al.

(10) Patent No.: US 6,682,097 B2
(45) Date of Patent: Jan. 27, 2004

(54) GUIDE SLEEVE FOR ELECTRIC CABLE EMERGING FROM A TUBE

(75) Inventors: Walter Krauss, München (DE); Stefan Schwald, Hersching (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 262 days.

(21) Appl. No.: 09/972,613

(22) Filed: Oct. 8, 2001

(65) Prior Publication Data

US 2002/0180202 A1 Dec. 5, 2002

(30) Foreign Application Priority Data

May 29, 2001 (DE) .......................... 101 26 119

(51) Int. Cl.[7] .............................................. B60R 22/36
(52) U.S. Cl. ...................................... 280/806; 242/374
(58) Field of Search .......................... 280/806; 242/374, 242/615.21, 615.3; 403/13, 14; 138/128, 151

(56) References Cited

U.S. PATENT DOCUMENTS

| 4,141,573 | A | * | 2/1979 | Ellens ........................ 297/482 |
|---|---|---|---|---|
| 4,589,680 | A | * | 5/1986 | Gurtler et al. ........... 280/801.1 |
| 4,856,937 | A | * | 8/1989 | Grocott et al. ........... 405/183.5 |
| 5,129,679 | A | * | 7/1992 | Specht et al. ................ 280/806 |
| 5,261,697 | A | * | 11/1993 | Fohl ........................... 280/806 |
| 5,290,062 | A | * | 3/1994 | Fohl ........................ 280/801.2 |
| 5,397,111 | A | * | 3/1995 | Knopp et al. ............. 267/64.12 |
| 5,519,997 | A | * | 5/1996 | Specht ......................... 60/632 |
| 5,641,131 | A | * | 6/1997 | Schmid et al. .............. 242/374 |
| 5,697,887 | A | * | 12/1997 | Yabe et al. ................. 600/123 |
| 5,728,045 | A | * | 3/1998 | Komi ......................... 600/156 |
| 5,762,070 | A | * | 6/1998 | Nagamatsu ................. 600/564 |
| 5,863,009 | A | * | 1/1999 | Bauer et al. ................ 242/374 |
| 5,971,488 | A | * | 10/1999 | Pedronno et al. ........... 297/468 |
| 6,325,416 | B1 | * | 12/2001 | Wier ........................... 280/806 |
| 6,357,795 | B1 | * | 3/2002 | Krauss et al. ............. 280/801.1 |
| 6,429,378 | B2 | * | 8/2002 | Shak ........................... 174/135 |
| 6,467,220 | B1 | * | 10/2002 | Hasse ........................... 49/502 |

* cited by examiner

*Primary Examiner*—Paul N. Dickson
*Assistant Examiner*—Deann Draper
(74) *Attorney, Agent, or Firm*—Lonnie Drayer

(57) ABSTRACT

A device for the lateral outward guiding of an electric cable installed in a tube has a deflector is arranged inside the tube obliquely to the longitudinal direction of the tube. The electric cable is deflected by the deflector through a lateral opening in the casing of the tube.

12 Claims, 2 Drawing Sheets

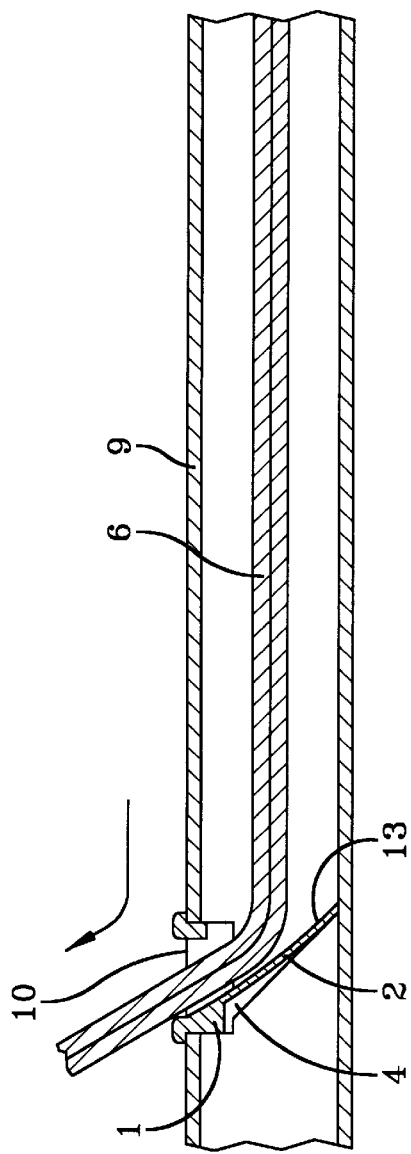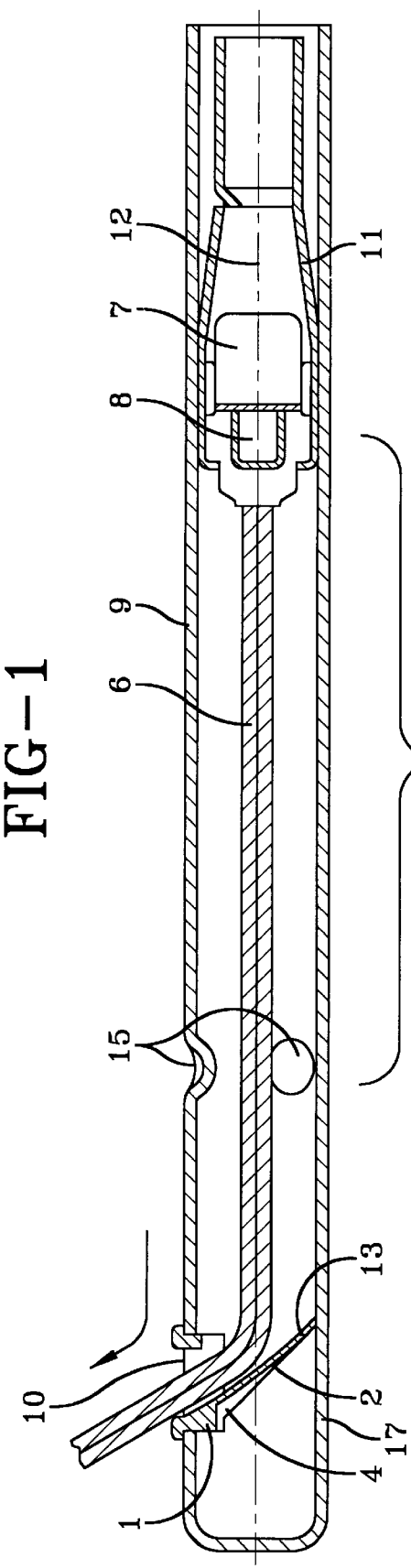

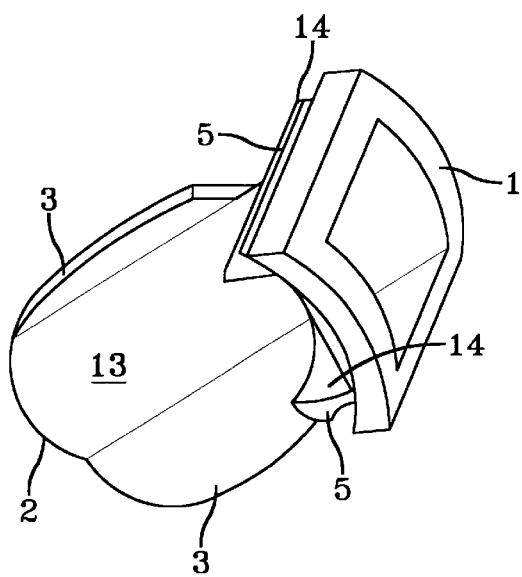
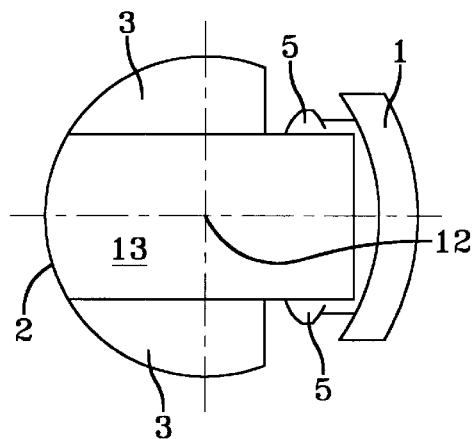
FIG-2
FIG-4
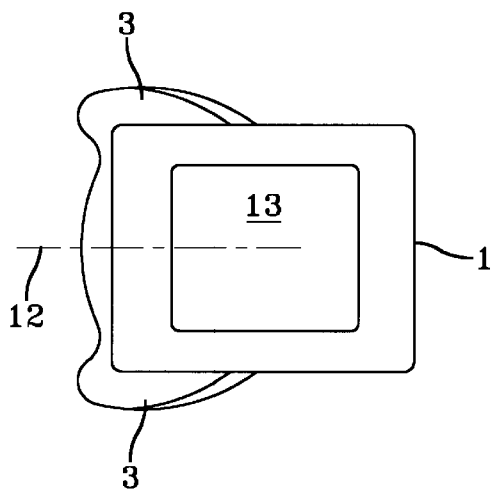
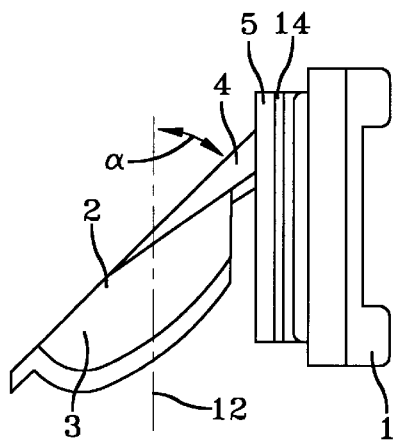
FIG-3
FIG-5

GUIDE SLEEVE FOR ELECTRIC CABLE EMERGING FROM A TUBE

FIELD OF THE INVENTION

The present invention relates to a guide sleeve for an electric cable emerging from a tube, such as a linear drive seat belt tightener.

DISCUSSION OF THE PRIOR ART

The lateral guiding of an electric cable that is installed in the longitudinal direction of a tube and inserted in the axial direction creates problems during assembly. These problems are increased if several electric cables are to be guided laterally out of the inside of the tube simultaneously.

In a device known from U.S. Pat. No. 5,519,997 for the drive of a seat belt tightener the ignition cable, by means of which the propellant is electrically ignited for the driving a piston in a cylinder, is placed in an essentially axial direction through the guide path, along which the piston is axially moved in the inside of the tube during its drive, and is guided outwardly from an opening at the tube end. As a result, during assembly, an easy guiding of the ignition cable connected with the ignitable propellant out of the inside of the tube is achieved, in particular during the insertion into the inside of the guide tube of the piston comprising the ignitable propellant. Due to the guiding out of the ignition cable at the tube end, however, in certain configurations of the piston cylinder of the seat belt tightener in the vehicle, difficulties can be encountered, which requires a significantly longer electric cable.

SUMMARY OF THE INVENTION

There is provided in accordance with the present invention a guide sleeve for electric cable emerging from a tube comprising a deflector insertable into the tube through a lateral opening in a casing of the tube obliquely to a longitudinal axis of the tube, via which deflector an electric cable is guided through said opening.

BRIEF DESCRIPTION OF THE DRAWINGS

FIG. 1 is a fragmentary longitudinal sectional view of a first embodiment of the invention.

FIG. 2 is a perspective representation of an embodiment of a cable guide sleeve, which is used in the embodiment of FIG. 1.

FIG. 3 is a top view of the cable guide sleeve according to FIG. 2.

FIG. 4 is a front view of the cable guide sleeve according to FIG. 2 with an attached deflector.

FIG. 5 is a side view of the cable guide sleeve according to FIG. 2.

FIG. 6 is a longitudinal sectional view of an embodiment of a seat belt tightener.

DETAILED DESCRIPTION OF THE INVENTION

FIGS. 2 to 5 show an embodiment of a cable guide sleeve 1, which forms a passage for an electric cable 6 guided laterally out of a tube 9, as shown in FIGS. 1 and 6. A cable guide device and deflector 2 in the form of a tongue or plate is attached to the cable guide sleeve 1. The deflector used in the present invention can be any type of complementing configuration of a cable guide sleeve, which serves as a lining for the lateral opening in the guide tube. This guide sleeve prevents any damage to the ignition cable guided laterally out of the guide tube, e.g. during the assembly or the installation of the drive device and during operation through pulling, vibration or other influences. In the exemplary embodiment shown in the drawings the deflector 2 comprises lateral spreading wings 3 as well as reinforcements or strengthening elements 4 on its reverse side whereby the risk of bending during the electric cable installation is reduced or eliminated. On its front side, the plate- or tongue-shaped deflector 2 comprises a guide surface 13, which is obliquely inclined with regard to the longitudinal axis 12 of the tube. The angle of inclination of the guide surface 13 with respect to with regard to the longitudinal axis 12 of the tube is approximately 45° as shown in FIG. 5. The arrangement and inclination of the guide surface 13 is such that it is directed towards a lateral opening 10 in the casing of the tube 9.

The cable guide sleeve 1, which lines the bordering edge of the lateral opening 10 in the casing of the tube 9, is a frame and can, as shown in FIG. 2, have a rectangular cross section. The electric cable 6 is guided laterally out of the tube through the opening or passage 10 enclosed by the frame, as shown in FIGS. 1 and 6.

To secure the cable guide sleeve 1 in the lateral opening 10 in the casing of the tube 9, undercuts 5 are provided on fastening projections 14, which extend downwards on the frame of the guide sleeve 1, which undercuts can engage bordering edges of the lateral opening 10. In this way a secure position of the cable guide sleeve 1 in the lateral opening 10 in the casing of the tube 9 is guaranteed and the bordering edges of the lateral opening are completely covered.

In the represented embodiment, the fastening projections 14 and the undercuts 5 formed thereon, which can also be latch grooves, are essentially perpendicular to one another. During the insertion into the lateral opening 10 in the casing of the tube 9, they engage parallel running bordering edges of the lateral opening 10. To this effect the fastening projections 14 are preferably resilient.

FIG. 2 is a perspective view of an embodiment of the cable guide sleeve 1 wherein the undercuts 5 of the cable guide sleeve 1 latch onto edges of the lateral opening 10 in the casing of the tube 9, for example a rectangular opening when viewed a top view. The deflector 2 has laterally spreading wings 3.

FIG. 3 is a top view of the cable guide sleeve 1, which has a frame lining the lateral opening 10 in the casing of the tube 9. The guide surface 13 on the deflector is visible through the frame opening of the cable guide sleeve 1.

FIG. 4 is a front view of the tongue or plate-shaped deflector 2 and the wings 3, the edges of which are complimentary with the inner wall of the tube.

FIG. 5 is a side view turned by 90° with relation to FIG. 4 of the cable guide sleeve 1, on which the deflector 2 is recognizable as the cable guide oblique in relation to the longitudinal axis 12 of the tube 9.

FIG. 1 is a fragmentary longitudinal section of a seat belt tightener comprising a tube 9, which can have any suitable cross section, e.g. angular, circular or oval. FIG. 6 is a longitudinal section of a seat belt tightener having a drive device for a linear seat belt tightener, as is described, for instance, in EP 0 842 831 B. The tube 9 is a guide tube for a piston 11 driven by an electrically ignited propellant 7. The electric cable 6 is the ignition cable for the propellant.

The cable guide sleeve 1 engages edges of the lateral opening 10 in the casing of the tube 9. The cable guide sleeve forms one piece with the deflector 2. This shaped piece, which is shown in FIGS. 2 to 5, is preferably made of a synthetic material.

The cable guide sleeve 1 lines the entire edge region of the opening 10 in the casing of the tube 9. This prevents the covering of the electric cable 6 from being damaged by the edges of the opening in the casing of the tube during installation of the electric cable and during its product life through pulling, vibration or the like. From the frame-shaped part of the cable guide sleeve 1, which provides the edge protection, the deflector 2 extends obliquely into the tube 9. The deflector 2 with the wings 3 is wider than the lateral opening 10 in the casing of the tube 9 and can be pressed together during installation in such a way that insertion through the lateral opening 10 into the tube 9 is possible. After the installation of the cable guide sleeve 1, the wings 3 spread open inside of the tube 9 in such a manner that the wings 3 lie against the inside wall of the tube 9 in an interference fit under light bias and close the inside of the tube in the axial direction of the cable guide. In this way the tube is blocked in the axial cable guide direction and, without the risk of interlocking or jamming of the electric cable, the ignition cable is guided outwardly from the inside of the tube through the lateral opening during the assembly of the drive device. During the assembly of the seat belt tightener drive device represented in FIG. 6, the one end of the electric cable is conductively connected to an ignition device 8 that is provided in the piston 11. During the insertion of the piston in the tube 9 from the right side, the electric cable 6 is also inserted into the tube and at its other end it is deflected by the guide surface 13 on the deflector 2 in the direction of the lateral opening 10 in the casing of the tube 9, which is enclosed by the cable guide sleeve 1. During insertion of the piston 11 into the inside of the tube until its operating position as shown in FIG. 6, the end of the electric cable 6 is guided out of the inside of the tube and can be conductively connected to a electric contact point, not further represented, which is provided in the vehicle. Similarly, during the insertion of the electric cable 6 in the embodiment shown in FIG. 1, the front end of the electric cable is guided outwardly from the interior of the tube 9.

The piston 11 of FIG. 6 can be connected directly or by means of pulling means or with a seat belt, not further represented, for instance with the belt webbing end or a belt buckle or another component of the seat belt system. During the tightening of the seat belt, the piston 11, after the ignition of the propellant 7 provided in the piston 11, is propelled to the left in FIG. 6 and moves along an axial guide path 16 in the guide tube 9 until a braking end stop 15. In the represented embodiment, this end stop 15 is created by one or several indentations of the tube casing extending into the inside of the tube.

In the represented embodiment of FIG. 6 the lateral opening 10 in the casing of the tube 9, via which the electric cable 6 is guided out of the inside of the tube, is positioned in a tube part 17 situated outside the axial guide path 16. The cable guiding created by the invention enables a shortening of electric cable length, as the latter can be exactly adapted to the cable length required by the installation conditions. In addition, during assembly the electric cable pushed outside through the inside of the tube is prevented from becoming interlocked or jammed. This arrangement facilitates and speeds up the outward guiding of the electric cable 6 from the tube 9.

The invention ensures that one or several electric cables can be easily guided out of the tube without interlocking or jamming. During installation, time is saved. In addition, a shorter electric cable length can be employed Because of the lateral outwards guiding of the electric cable from the guide tube, the electric cable can be guided along the shortest path to the external electric connection device.

The guide sleeve for electric cable emerging from a tube according to the present invention can be used with any types of tubes, in which electric cables are placed. The tubes can be made of metal or synthetic material, and can comprise a circular, oval or angular cross section. The invention is particularly useful with electric cables in tube-shaped hollow bodies in motor vehicles, as for instance in the doorsill of a motor vehicle, such as a linear seat belt tightener.

Many changes and modifications in the above described embodiments of the invention can, of course, be carried out without departing from the scope thereof. Accordingly, that scope is intended to be limited only by the scope of the appended claims.

We claim:

1. A cable guide sleeve for an electric cable emerging from a tube comprising a deflector insertable into the tube through a lateral opening in a casing of the tube obliquely to a longitudinal axis of the tube, via which deflector an electric cable is guided through said opening, the cable guide sleeve having at least one undercut or latch groove that can latch onto the border of the opening in the casing of the tube.

2. The cable guide sleeve for an electric cable emerging from a tube according to claim 1 wherein the guide sleeve has a frame that can line a border of the lateral opening in the casing of the tube.

3. The cable guide sleeve for an electric cable emerging from a tube according to claim 1 wherein the deflector comprises a guide surface running obliquely to the longitudinal axis of the tube and extending to the lateral opening in the casing of the tube.

4. The cable guide sleeve for an electric cable emerging from a tube according to claim 1 wherein the cable guide sleeve and the deflector are one piece.

5. The cable guide sleeve for an electric cable emerging from a tube according to claim 1 wherein the deflector is a deflector plate that extends across essentially the entire cross section of the tube.

6. The cable guide sleeve for an electric cable emerging from a tube according to claim 1 wherein the deflector can be laterally widened.

7. The cable guide sleeve for an electric cable emerging from a tube according to claim 6 wherein during the insertion of the guide sleeve in the lateral opening in the casing of the tube a widening deflector is adjacent to the inner wall of the tube in an essentially interlocking manner.

8. The cable guide sleeve for an electric cable emerging from a tube according to claim 1 wherein a reverse side of the deflector comprises a rear projecting reinforcement.

9. The cable guide sleeve for an electric cable emerging from a tube according to claim 1 wherein the cable guide sleeve and the deflector are made of a synthetic material.

10. The cable guide sleeve for an electric cable emerging from a tube according to claim 1 in combination with a tube for an axially movable guided piston for a drive of a seat belt tightener, and an electric cable that is an ignition cable for igniting an electrically ignitable propellant for driving a piston along a guide path inside the tube, whereby the ignition cable extends along the guide path inside the tube and is guided out of the inside of the tube through the lateral opening of the casing of the tube by the deflector arranged inside the tube.

11. The cable guide sleeve for an electric cable emerging from a tube according to claim 10 wherein the lateral opening in the casing of the tube is arranged in a part of the tube situated outside the axial guide path of the driven piston.

12. The cable guide sleeve for an electric cable emerging from a tube according to claim 10 wherein the end of the guide path is determined by an end stop, in particular in the shape of at least one indentation in the tube wall.

* * * * *